United States Patent [19]

Puetz

[11] Patent Number: 5,306,432

[45] Date of Patent: Apr. 26, 1994

[54] WATER PURIFICATION

[75] Inventor: John D. Puetz, Oak Creek, Wis.

[73] Assignee: Great Lakes Biochemical Co., Inc., Milwaukee, Wis.

[21] Appl. No.: 104,368

[22] Filed: Aug. 9, 1993

[51] Int. Cl.$^5$ .............................................. C02F 1/50
[52] U.S. Cl. ................................... 210/759; 210/755; 210/764; 422/28; 422/37
[58] Field of Search ............... 210/758, 759, 755, 764; 422/28, 37; 424/613; 514/642; 252/175, 180, 181

[56] References Cited

U.S. PATENT DOCUMENTS

| | | | |
|---|---|---|---|
| 2,971,428 | 12/1959 | Hitzman | 210/764 |
| 3,201,311 | 8/1965 | Antonides et al. | 210/755 |
| 3,285,959 | 11/1966 | McFarlane | 210/755 |
| 3,479,406 | 11/1969 | Wakeman | 210/755 |
| 3,690,860 | 9/1972 | Salutsky et al. | 210/764 |
| 4,880,547 | 11/1989 | Etani | 210/764 |

FOREIGN PATENT DOCUMENTS 0059978 9/1982 European Pat. Off. ............ 210/759

Primary Examiner—Neil McCarthy
Attorney, Agent, or Firm—Kane, Dalsimer, Sullivan, Kurucz, Levy, Eisele and Richard

[57] ABSTRACT

A synergistic combination of a water-soluble, antibacterial quaternary ammonium compound and a water-soluble oxidizing agent is found to improve effectiveness in controlling bacterial growth in swimming pool water, particularly hard water.

1 Claim, No Drawings

WATER PURIFICATION

BACKGROUND OF THE INVENTION

1. Field of the Invention

The invention relates to water purification and more particularly relates to methods and compositions for disinfecting water in swimming pools.

2. Brief Description of Related Art

The water contained in swimming pools of any size need not be of potable quality but for aesthetic and hygienic reasons it is desirably maintained free of solid and microbiological contaminants. Normal maintenance may include filtration, for example through sand, diatomaceous earth or cartridge filters and treatment with a biocide such as chlorine or chlorine containing compounds.

In recent years, the art has sought to replace chlorine as a pool water disinfectant because of certain disadvantages associated with its use. For example, chlorine in biocidal (germicidal) concentrations may be an irritant to human bathers. Also, chlorine in water will react with many organic compounds which may be present in the water, to produce chlorinated derivatives commonly referred to as "haloforms"; see Rook, "Formation of Haloforms During Chlorination of Natural Waters", J. Water Treatment Exam., 1974, pp. 234–243. These haloforms, for example chloroform, methyl chloride, carbon tetrachloride, chloroacetone and the like may be hazardous to humans and their formation in swimming pool water is to be avoided. Chloramines are also formed, which are responsible for skin, eye and raucous membrane irritations and the odor of chlorine associated with many swimming pools. Removal of dissolved haloforms generally requires aeration, which also removes substantial quantities of the chlorine. In such a system, the chlorine must be replenished at frequent intervals so as to maintain a concentration of from about 0.5 to 20 ppm.

Other processes based on the use of an oxidizing agent for germicidal activity include the use of inorganic peroxy acids such as peroxymonosulphuric acid or peroxymono- phosphoric acid. However, these acidic products are relatively poor germicides and are not stable in alkaline or neutral waters such as swimming pool water.

indirect oxidants such as sodium hypochlorite (bleach) are also well known germicides but they generally are highly alkaline compositions (to maintain stability) and may cause precipitation of water-hardness salts present in the water, and may cause changes in pH which must then be readjusted with a suitable acid.

Certain selected quaternary ammonium compounds have also been used for their bactericidal activity in water supplies; see for example the descriptions given in U.S. Pat. Nos. 3,332,871; 4,539,071; and 4,925,866. These compounds are generally non-irritating to humans and odor free. However, their effectiveness in water is somewhat limited to soft (low calcium content) or distilled waters. Efficacy generally decreases when the treated water is hard or has an appreciable calcium content, for example at levels of about 300 mg/liter or more.

We have discovered that a particular combination of selected quaternary ammonium compounds and an oxidizer shows unexpected antibacterial activity, even in hard waters.

SUMMARY OF THE INVENTION

The invention comprises in swimming pool water an antibacterial combination improvement which comprises;
the presence of a water-soluble, antibacterial quaternary ammonium salt; and
a water-soluble oxidizing agent.

The term "water-soluble" as used herein means the compound will have a solubility in distilled water, at room temperatures, of at least about 50 mg/liter.

The combination of the invention exhibits synergistic antibacterial activity when used in the method of the invention, which comprises; dissolving an effective amount for antibacterial activity of the ingredients in swimming pool water.

DETAILED DESCRIPTION OF THE PREFERRED EMBODIMENTS OF THE INVENTION

Water-soluble quaternary ammonium salts are a well known class of organic compounds as are methods of their preparation. Representative of water-soluble quaternary ammonium salts having antibacterial activity are those of the general formula:

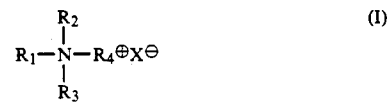

wherein x represents counterion and $R_1$, $R_2$, $R_3$ and $R_4$, are each independently selected from hydrogen and hydrocarbyl of from 1 to 25 carbon atoms, inclusive, provided that the sum of carbon atoms in $R_1 + R_2 + R_3 + R_4$ is from about 10 to about 25.

Preferred as water-soluble quaternary ammonium salts having antibacterial activity are compounds within the formula (I) given above having the more specific formula wherein X is selected from the group consisting of an organic or inorganic anion such as nitrate, benzoate, phenylacetate, hydroxybenzoate, phenoxide, hydroxide, cyanide and nitrite. Particularly preferred are chloride, bromide, acetate, formate, propionate, hydrogen sulfate, methyl sulfate, ethyl sulfate and the like.

Most preferred as the water-soluble quaternary ammonium salts having anti-bacterial activity are the compounds of Formula (I) given above wherein X represents halide and at least one of $R_1$, $R_2$, $R_3$ and $R_4$, is hydrocarbyl having 6 to 18 carbon atoms, inclusive.

The quaternary ammonium salts employed in the method of the invention require water-solubility. The lowest molecular weight salts generally exhibit the highest solubilities. As the hydrocarbyl groups of $R_1$, $R_2$, $R_3$ and $R_4$, increase in carbon chain length, solubility in water decreases.

On the other hand, highest antibacterial activity of the quaternary ammonium salts generally is associated with those of higher molecular weight. The anti-bacterial activity is related to reaction between the salt and protein, causing precipitation and denaturation of the protein. Generally, the highest (optimum) antibacterial activity is found in the compounds of formula (I) wherein one of $R_1$, $R_2$, $R_3$ and $R_4$, is benzyl, and one of the remaining $R_1$, $R_2$, $R_3$ and $R_4$, is an aliphatic moiety containing 12 to 16 carbon atoms, inclusive.

The term "hydrocarbyl" as used herein means the monovalent moiety obtained upon removal of a hydrogen atom from a hydrocarbon. Representative of hydrocarbyl are alkyl of 1 to 25 carbon atoms, inclusive, such as methyl, ethyl, propyl, butyl, pentyl, hexyl, heptyl, octyl, nonyl, undecyl, decyl, dodecyl, octadecyl, nonodecyl, eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like; alkenyl of 2 to 25 carbon atoms, inclusive, such as vinyl, allyl, butenyl, pentenyl, hexenyl, octenyl, nonenyl, decenyl, undececyl.

Representative of quaternary ammonium salts preferably used in the method of the invention are trioctylmethylammonium chloride, tetrahexylammonium chloride, tetrabutylammonium chloride, dioctyldimethylammonium chloride, didodecylmethylammonium chloride, didecyldimethylammonium chloride, diheptyldimethylammonium chloride, dodecyldimethylbenzylammonium chloride, tetradecyldimethylbenzylammonium chloride, hexadecyldimethylbenzylammonium chloride, dimethylethylcetylammonium chloride, cetyltrimethylammonium chloride, triethylgeranylammonium chloride, triethylneryl-ammonium chloride, tributylmethylammonium chloride, tetraethylammonium chloride, triethylbenzylammonium chloride, tripropylgeranylammonium chloride, tri-octylgeranylammonium chloride, tributylgeranylammonium chloride, dodecyldimethylethylbenzylammonium chloride, octadecyldimethylbenzylammonium chloride and the like. Most preferred for use in the composition and the method of the invention are the dialkyldimethylammonium halides where the alkyl groups contains 8 to 16 carbon atoms, inclusive, such as decylisononyldimethylammonium chloride and the like.

Water-soluble oxidizing agents employed in the invention are also well known compounds as are methods of their preparation. Although the oxidizing agent may be a chlorine based bleach, such as sodium hypochlorite and the like, it is preferred to use inorganic or organic peroxide compounds. Representative of such peroxides are alkali metal perborates, persulfates, percarbonates, peracetates and perbenzoates. Most preferred are the cold-water soluble inorganic peroxy compounds such as peroxymonophosphoric acid, peroxydiphosphoric acid, peroxymonosulphuric acid, peroxydisulphuric acid and the alkali metal and ammonium salts thereof, in particular tetrapotassium peroxydiphosphate, tetrasodium pyrophosphate bis(peroxyhydrate), diammonium peroxydisulphate, dipotassium peroxydisulphate, disodium peroxydisulphate and the triple salt which comprises two moles of potassium monopersulfate, one mole of potassium hydrogen sulfate and one mole of potassium sulfate.

Peroxymonosulphuric acid and the alkali metal and ammonium salts thereof are preferred. Peroxymonosulphuric acid is commercially available in aqueous solution as Carols acid prepared by addition of concentrated hydrogen peroxide to concentrated sulphuric acid. Depending on the mixing ratio and initial concentrations of the acid and the hydrogen peroxide, the composition of Carols acid can vary to some extent. Conventionally, concentrated sulphuric acid (96 to 98%) is added to a hydrogen peroxide solution of about 70% in a ratio within the range of 0.5:1 to 1:3. Relatively high levels of $H_2SO_5$ can be achieved by mixing e.g. 96%-$H_2SO_4$ and 85%-$H_2O_2$ in equimolar ratio resulting in a Caro's acid composition comprising about 49% by weight of $H_2SO_5$, about 26% by weight of $H_2SO_4$ and about 9% by weight of $H_2O_2$. However, to avoid the safety hazards attached to very high concentrations of $H_2O_2$, it may be desirable to start with e.g. equimolar amounts of 98%-$H_2SO_4$ and 50%-$H_2O_2$, which results in a Caro's acid composition comprising about 23% by weight of $H_2SO_5$, about 40% by weight of $H_2SO_4$ and about 13% by weight of $H_2O_2$.

An alternative form of Carols acid is prepared by electrolysis of ammonium sulphate, resulting in an aqueous solution of ammonium bisulphate and peroxymonobisulphate. In solid form it is commercially available as the triple salt $KHSO_5{:}KHSO_4{:}K_2SO_4$ in the molar ratio of about 2:1:1, and, accordingly, comprises about 40% by weight of the active oxygen compound, corresponding to about 5% active oxygen by weight of the triple salt.

The inorganic peroxy compound is used in the present invention in an amount of from about 0.5 to about 2 pounds per 10,000 gallons of water to be maintained as disinfected.

The quaternary ammonium salt is used with the oxidizing agent to obtain the benefits of the invention by adding the two active ingredients together or separately to the swimming pool water with thorough mixing. The quaternary ammonium salt is added to the swimming pool water in an amount effective for bactericidal action. In general, a concentration of from about 25 to about 75 ppm of the water is effective.

The following examples describe the manner and process of making and using the invention and set forth the best mode contemplated by the inventor for carrying out the invention but are not to be construed as limiting the scope of the invention. All parts are by weight unless otherwise stated. In the Tables, the abbreviation "TNTC" means "too numerous to count".

EXAMPLE 1

Suitable flasks were charged with distilled water harboring the microorganism *Escherichia coli* in a cell density of $1.0 \times 10^8$ CFU/ml. To the charge there was added with stirring 50 ppm of decylisononyldimethylammonium chloride (DIDA) for run "A", or 10 ppm of the triple salt $KHSO_5{:}KHSO_4{:}K_2SO_4$ in the ratio of about 2:1:1 (salt) for run "B" or in a run "C" a combination of the DIDA (50 ppm) with the salt (10 ppm). At the end of various time periods, the residual microorganism density was observed. The time periods and the density observations ate set forth in the Table I, below.

TABLE I

| Biocide Effect on *E. coli* with cell density of $1.0 \times 10^8$ CFU/ml. in distilled water. | | | | |
|---|---|---|---|---|
| | TIME: | | | |
| | 15 sec. | 30 sec. | 60 sec. | 120 sec. |
| Run A (DIDA) | TNTC | TNTC | TNTC | <1 |
| Run B (SALT) | TNTC | TNTC | TNTC | TNTC |
| Run C (DIDA & SALT) | TNTC | TNTC | TNTC | 12 |

EXAMPLE 2

The procedure of Example 1, supra., is repeated except that the distilled water was replaced with a "hard" water containing 300 ppm of calcium as calcium carbonate and the cell density at the start was $1.0 \times 10^7$ CFU/ml. The observations are set forth in Table II, below.

TABLE II

Biocide effect on *E. coli* with cell density of $1.0 \times 10^7$ CFU/ml. in hard water (300 ppm calcium as calcium carbonate).

| | TIME: | | | |
|---|---|---|---|---|
| | 1 min. | 5 min. | 10 min. | 20 min. |
| Run D (DIDA) | TNTC | TNTC | TNTC | $1 \times 10^2$ |
| Run E (SALT) | TNTC | TNTC | TNTC | 34 |
| Run F (DIDA & SALT) | TNTC | 56 | <1 | <1 |

EXAMPLE 3

The procedure of Example 1, supra., was repeated except that the *E. coli* was used therein was replaced with a density of $2.0 \times 10^8$ CFU/ml of *S. faecalis*. The observations are set forth in the Table III, below.

TABLE III

Biocide effect on *S. faecalis* with cell density of $2.0 \times 10^8$ CFU/ml. in distilled water.

| | TIME: | | | |
|---|---|---|---|---|
| | 15 sec. | 30 sec. | 60 sec. | 120 sec. |
| Run G (DIDA) | TNTC | TNTC | TNTC | TNTC |
| Run H (SALT) | TNTC | TNTC | TNTC | TNTC |
| Run I (DIDA & SALT) | 10 | 10 | 7.5 | 18 |

EXAMPLE 4

The procedure of Example 3, supra., was repeated except that the distilled water as used therein was replaced with "hard" water containing 300 ppm calcium as calcium carbonate. The observations made are set forth in Table IV, below.

TABLE IV

Biocide effect on *S. faecalis* with cell density of $2.0 \times 10^8$ CFU/ml. in hard water (300 ppm calcium as calcium carbonate).

| | TIME: | | | |
|---|---|---|---|---|
| | 1 min. | 5 min. | 10 min. | 20 min. |
| Run J (DIDA) | TNTC | TNTC | TNTC | TNTC |
| Run K (SALT) | TNTC | TNTC | TNTC | TNTC |
| Run L (DIDA & SALT) | TNTC | TNTC | <1 | <1 |

I claim:
1. A method for inhibiting growth of bacteria in swimming pool water, which comprises; mixing in the water 25 to about 75 ppm of decylisononyldimethyl ammonium chloride and 0.5 to 2 pound per 10,000 gallons of water of the triple salt $KHSO_5:KHSO_4:K_2SO_4$.

* * * * *

UNITED STATES PATENT AND TRADEMARK OFFICE
CERTIFICATE OF CORRECTION

PATENT NO. : 5,306,432
DATED : April 26, 1994
INVENTOR(S) : John D. Puetz

It is certified that error appears in the above-identified patent and that said Letters Patent is hereby corrected as shown below:

Col. 1, line 34; "raucous membrane" should read
-- mucous membrane -- .

Col. 4, line 1; "(96 to 984)" should read
-- (96 to 98%) -- .

Col. 4, line 16; "Carols acid" should read
-- Caro's acid -- .

Signed and Sealed this

Ninth Day of August, 1994

Attest:

BRUCE LEHMAN

Attesting Officer

Commissioner of Patents and Trademarks